United States Patent Office 2,753,303
Patented July 3, 1956

2,753,303

OIL-SOLUBLE SURFACE ACTIVE COMPOSITION

George E. Barker, Llangollen Estates, Del., assignor to Atlas Powder Company, Wilmington, Del., a corporation of Delaware No Drawing. Application December 3, 1953,
Serial No. 396,073

7 Claims. (Cl. 252—8.55)

This invention relates to surface active agents and more particularly to surface active compositions which are oil-soluble.

It is an object of the invention to provide novel surface active agents compositions.

A further object is to provide surface active agent compositions which are soluble in oil.

Another object of the invention is to provide a surface active composition which suppresses wax deposition from paraffin-rich crude oil.

A still further object of the invention is to provide compositions for the treatment of oil wells.

It is also an object of the invention to provide a process for preventing the deposition of wax on metal surfaces from crude oils rich in paraffin.

The above and other objects will become more apparent in the course of the following description of the invention and in the appended claims.

Surface active agents are frequently employed at very low concentrations and solubility at higher concentrations would, at first, seem to be of little importance. The problem of dispersing the small effective amount of an agent throughout the mass of a liquid in which it is to be employed may, however, offer difficulties and it is convenient to be able to supply a concentrate of the agent in a medium which is either the same as the liquid to be treated or is readily compatible therewith.

A group of surface active agents which have been found very useful in the field of petroleum production and processing comprises the polyoxyethylene ethers of sorbitan tri-tall oil ester containing from 10 to 50 oxyethylene groups per mol. These compounds have been found particularly effective in preventing the deposition of wax from petroleum products rich in paraffin. Such deposition occurs particularly on metal surfaces in contact with paraffin-rich crude oils, as in pumps, pipe lines, storage tanks, and the like. The difficulties introduced by such deposition and the desirability of adding an agent to prevent it are obvious.

The said surface active agents have a very limited solubility in petroleum products and their direct introduction into oil wells, pipe lines and storage tanks in useful concentrations is impractical.

In accordance with the present invention oil-soluble compositions are provided which comprise mixtures of the aforesaid ether-esters and condensation products of fatty amines with from 2 to 6 molar proportions of ethylene oxide. The ether-ester component comprises at least 50% by weight of the said mixture and the amine-ethylene oxide composition at least 5%. Mixtures of intermediate compositions are suitable with the proviso that there be sufficient of the amine-ethylene oxide condensation product to render the mixture as a whole soluble in mineral oil. As the number of oxyethylene groups in the ether-ester increases the minimum permissible proportion of amine-ethylene oxide to effect oil-solubility increases likewise.

The components of the mixture of the invention are known in the art and may readily be prepared by conventional means. The ether-ester component may be prepared, for example, in a two-stage reaction, as follows. One molar proportion of sorbitol is esterified with three equivalent weights of tall oil in the temperature range of 200° to 250° C. until the acid number reaches a low constant value. The resulting product is predominantly the tri-tall oil ester of sorbitan. The formed ester is then introduced into an autoclave, heated to 80° to 150° C. and subjected to incremental addition of ethylene oxide while maintaining the temperature in that range and allowing the pressure to subside after each addition. The reaction is exothermic and cooling may be necessary to maintain the temperature in the specified range. From 10 to 50 molar proportions of ethylene oxide may be so introduced in order to prepare ether-esters useful in the compositions of the invention.

The fatty amines used in preparing the amine-ethylene oxide condensation products employed in the invention may be the pure aliphatic amines such as lauryl amine, cetyl amine, oleyl amine, stearyl amine, linoleyl amine, and the like, or may equally well be the commercially available amines containing mixtures of aliphatic radicals corresponding in composition to those obtainable by replacing the carboxyl group of the mixed acids, split from naturally occurring fats and oils, with —$CH_2NH_2$. Such fatty amines may conveniently be designated by the natural oil from which they are indirectly derived. Thus "soya amine" refers to the mixture of aliphatic amines derived from the fatty acid of soya bean oil through replacement of carboxyl by —$CH_2NH_2$. Correspondingly, coconut amine refers to the mixture amines derived from the fatty acids from coconut oil. It is rich in lauryl amine and contains smaller proportions of octyl, decyl, myristyl and cetyl amines.

The amine-ethylene oxide condensation products employed in the compositions of the invention are prepared from the said amines by the direct addition of from 2 to 6 molar proportions of ethylene oxide.

In the following table specific compositions coming within the purview of the invention are exemplified. The first column identifies the ether-ester, component by the number ($n$) of oxyethylene groups condensed per mol of sorbitan tri-tall oil ester. The second column lists the percentage of said ether-ester. The third column identifies the amine of the amine-ethylene oxide component. The fourth column lists the number ($n^1$) of mols of ethylene oxide condensed per mol of amine, and the last column lists the percentage of the second component.

| Example No. | Esther-Ester Component | | Amine-Ethylene Oxide Component | | |
|---|---|---|---|---|---|
| | $n$ | Percent | Amine | $n^1$ | Percent |
| I | 20 | 90 | Soya | 5 | 10 |
| II | 10 | 95 | Oleyl | 6 | 5 |
| III | 20 | 60 | Lauryl | 2 | 40 |
| IV | 20 | 50 | Cetyl | 5 | 50 |
| V | 50 | 55 | Soya | 5 | 45 |
| VI | 30 | 65 | Coconut | 4 | 35 |
| VII | 50 | 60 | Oleyl | 2 | 40 |

For convenience in injecting the compositions into pumping wells, or into other petroleum processing systems, concentrates thereof may be prepared in light mineral oil fractions such as kerosene, naphtha, or the like. Thus, for example, 2 parts of the composition of Example IV may be dispersed in one part of kerosene to yield a clear solution of low viscosity. The injection of this solution into the intake pipe of a pumping oil well at the rate of 1 to 5 pounds per day for a well producing 10 to 50 barrels of oil per day inhibits the deposition of wax on the walls of the pipe and pump conduits, even from high paraffin crudes.

Similarly, the product of Example I may be cut with its own weight of kerosene and injected into the intake pipe of a pumping well at the rate of 1 to 5 pounds per day for a well producing from 10 to 50 barrels of crude oil per day.

Dispersion of 0.1% by weight of the product of Example III in crude oil in storage tanks effectively inhibits the deposition of wax on the walls of such tanks.

What is claimed is:

1. An oil-soluble surface active composition comprising at least 50% by weight of a polyoxyethylene ether of sorbitan tri-tall oil ester containing from 10 to 50 oxyethylene groups per mol; and at least 5% by weight of a fatty amine-ethylene oxide condensation product containing from 12 to 20 carbon atoms in the fatty radical and from 2 to 6 oxyethylene groups per mol of amine, the proportion of said condensation product being sufficiently great to render the composition soluble in mineral oil.

2. An oil-soluble surface active composition comprising 90% by weight of the polyoxyethylene ether of sorbitan tri-tall oil ester containing 20 oxyethylene groups per mol and 10% by weight of the condensation product of soya amine with 5 molar proportions of ethylene oxide.

3. An oil-soluble surface active composition comprising 60% by weight of the polyoxyethylene ether of sorbitan tri-tall oil ester containing 50 oxyethylene groups per mol and 40% by weight of the condensation product of oleyl amine with 2 molar proportions of ethylene oxide.

4. A process for inhibiting wax deposition from crude oil which comprises injecting into the intake pipe of a pumping oil well a solution of the product of claim 1 in a light mineral oil fraction.

5. The process of claim 4 wherein the said mineral oil fraction is kerosene.

6. The process of claim 4 wherein the ratio of said product to said mineral oil fraction lies between the inclusive limits of 2/1 and 1/1.

7. A surface active solution comprising a light mineral oil fraction containing dissolved therein a mixture consisting of at least 50% by weight of a polyoxyethylene ether of sorbitan tri-tall oil ester containing from 10 to 50 oxyethylene groups per mol; and at least 5% by weight of a fatty amine-ethylene oxide condensation product containing from 12 to 20 carbon atoms in the fatty radical and from 2 to 6 oxyethylene groups per mol of amine, the proportion of said condensation product being sufficiently great to render the composition soluble in mineral oil.

References Cited in the file of this patent
UNITED STATES PATENTS

| | | |
|---|---|---|
| 1,892,205 | De Groote | Dec. 27, 1932 |
| 2,092,936 | Smith | Sept. 14, 1937 |
| 2,174,762 | Schuette et al. | Oct. 3, 1939 |
| 2,364,222 | Kaufman | Dec. 5, 1944 |
| 2,470,831 | Monson | May 24, 1949 |
| 2,559,584 | Barker | July 10, 1951 |
| 2,580,765 | Hall | Jan. 1, 1952 |